United States Patent [19]
Lawless

[11] 3,777,847
[45] Dec. 11, 1973

[54] COUPLING PLATE

[76] Inventor: Thomas R. Lawless, 2218 Fairport Ave., Dayton, Ohio 45406

[22] Filed: July 6, 1971

[21] Appl. No.: 159,619

[52] U.S. Cl......... 184/1 R, 123/195 A, 123/196 R, 184/104 B
[51] Int. Cl........................................ F01m 11/00
[58] Field of Search................ 123/195 A, 41.52; 165/76; 62/298; 285/137; 184/104 B, 1 R; 248/14; 29/401

[56] References Cited
UNITED STATES PATENTS
3,223,197  12/1965  Conover et al.............. 184/104 B X
3,096,849  7/1963  Chaplin et al. ..................... 184/6.5

Primary Examiner—Manuel A. Antonakas
Attorney—John P. Tarlano

[57] ABSTRACT

A coupling plate for coupling an oil cooler to an engine block which has lost its oil cooler mounting ears is disclosed. The coupling plate has oil ports therein for transferring oil between the engine block and oil cooler. In the area between the oil ports within the coupling plate is placed a countersunk coupling hole for connecting the coupling plate to the engine block. Oil cooler stud holes for connecting oil cooler studs of the oil cooler to the coupling plate are provided in the coupling plate. The coupling plate has an elliptical engine block stud hole therein for holding the coupling plate between the oil cooler and the damaged engine block. The coupling plate is used to connect an oil cooler to an engine block which has losted its oil cooler ears.

2 Claims, 7 Drawing Figures

INVENTOR
THOMAS R. LAWLESS

BY John P. Tarlano

HIS ATTORNEY

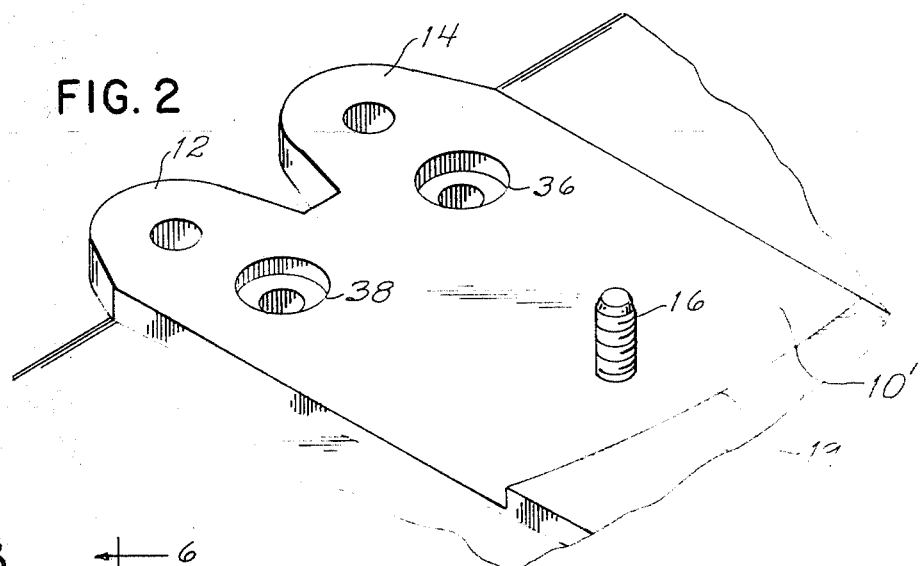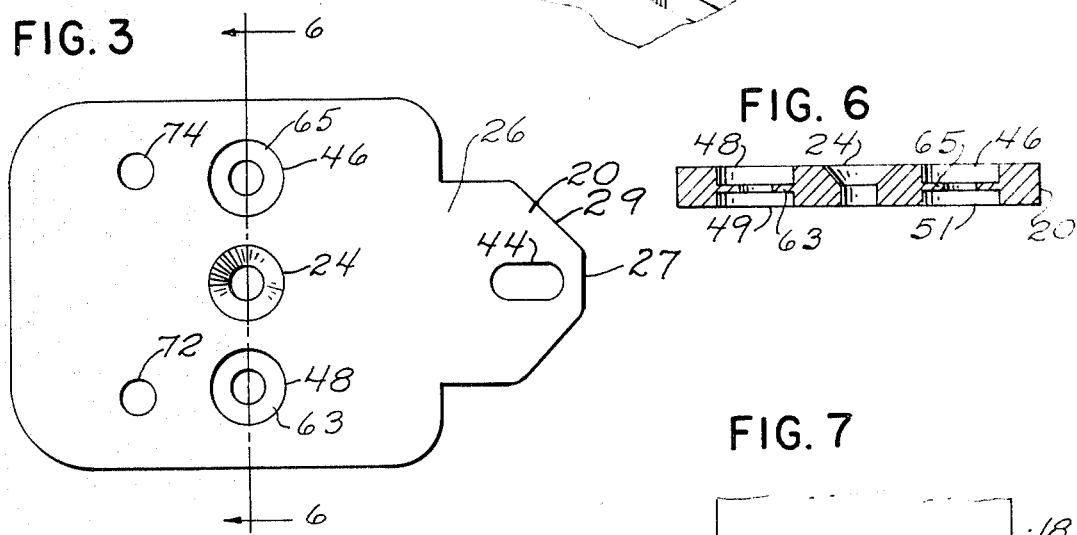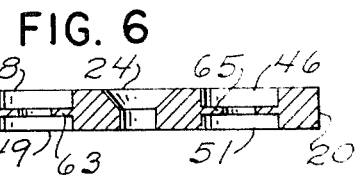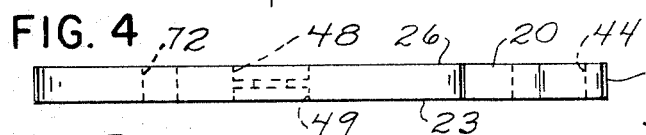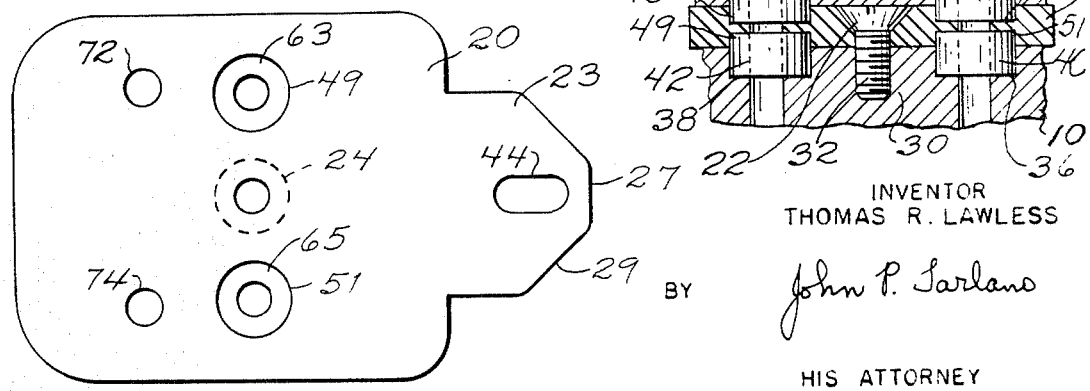

COUPLING PLATE

BACKGROUND OF THE INVENTION

In the prior art couplers are known which connect one object to another. The couplers however do not have two oil ports on either side of a coupling plate with oil ports dividers therebetween to hold oil seals between the two objects which are to be coupled.

The coupling plate of the present invention has two oil ports to either side of the coupling plate. The four oil ports are formed from four counterbored holes in the coupling plate. Four oil seals will fit into the four counterbored holes of the coupling plate. By using two oil port dividers between the two oil ports on either side of the coupling plate, the length of oil seals to be placed therein is made less than half of the length of the oil seals which would be required without the metal. Since shorter oil seals may be used, a better oil seal is obtained with the coupling plate of the present invention. If two oil seals were placed completely through the coupling plate, oil leakage would come about once the reassembled engine began to operate.

The coupling plate further has a countersunk coupling hole between the four oil ports of the coupling plate. The counterbored coupling hole is not bored to fully accommodate a tapered flat head screw therein. Thus the top of the tapered flat head screw is compressed between the oil cooler and the coupling plate to prevent the tapered flat head screw from unscrewing and causing an oil leakage. Thus the coupling plate of the present invention is designed to provide for maximum oil sealing between an oil cooler and a damaged engine block.

SUMMARY OF THE INVENTION

The present invention relates to a coupling plate for coupling an oil cooler to a damaged engine block which has lost its oil cooler mounting ears comprising a flat plate which has an oil ports therein, the oil ports being two holes counterbored on either side of the flat plate, a countersunk coupling hole in the area between the oil ports for connecting the coupling plate to the damaged engine block, two oil cooler stud holes to one side of said oil ports within said flat plate to couple said oil cooler to said coupling plate and an elliptical engine block stud hole formed in the coupling plate on the opposite side of said oil ports from said oil cooler stud holes for allowing said coupling plate to be rigidly held by an engine block stud.

An object of the present invention is to provide a coupling plate for coupling an oil cooler to an engine block which has lost its oil cooler mounting ears.

Another object of the present invention is to provide a coupling plate which will prevent oil leakage between an oil cooler and an engine block which has lost its oil cooler mounting ears.

DESCRIPTION OF THE DRAWINGS

FIG. 2 is a prespective view of an undamaged engine with the oil cooler mounting ears thereon.

FIG. 3 is a top plan view of the coupling plate of the present invention.

FIG. 4 is a side plan view of the coupling plate of the present invention.

FIG. 5 is a bottom plan view of the coupling plate of the present invention.

FIG. 6 is a sectional view of the coupling plate of FIG. 3 taken along the line 6 — 6.

FIG. 7 is a sectional view of an assembled coupling plate with the oil seals therein.

DESCRIPTION OF THE PREFERRED EMBODIMENT

Figure 1:
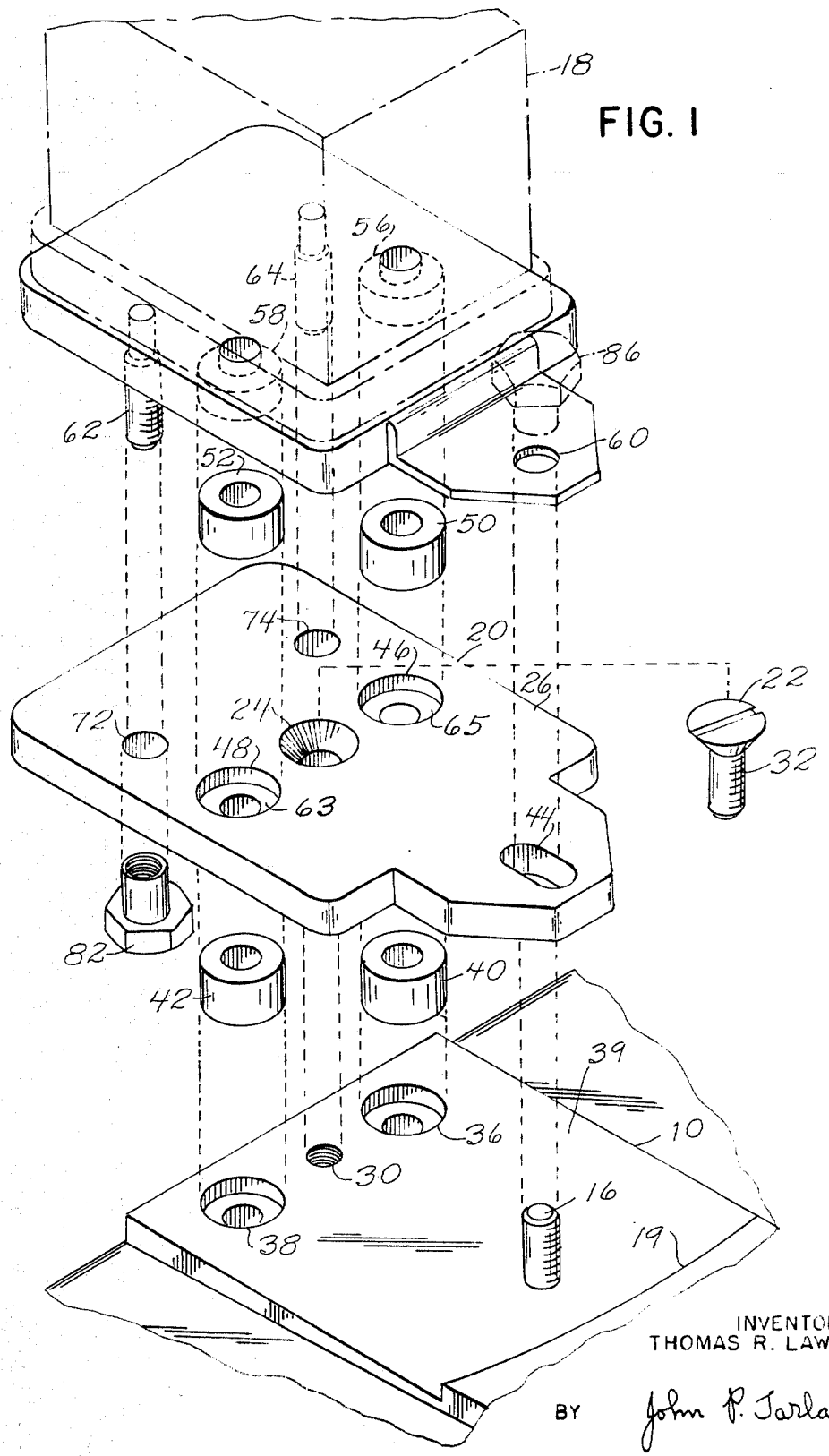
FIG. 1 is a prespective view of an oil cooler connected to an engine whose oil cooler mounting ears have been sheared off.

FIGS. 1 and 2 show a Volkswagen engine block 10 whose oil cooler mounting ears 12 and 14 have been sheared off due to an auto collision. An oil cooler 18 is usually pushed over to shear the oil cooler mounting ears 12 and 14 of FIG. 2 off of the Volkswagen engine block of FIG. 1. During the auto collision the engine block stud 16 is not normally sheared from the Volkswagen engine block 10. In order to remount a Volkswagen oil cooler 18 back on to a damaged Volkswagen engine block 10 shown in FIG. 1, the coupling plate 20 of the present invention is used. The coupling plate 20 is designed to pass a tapered flat head screw 22 through a countersunk coupling hole 24 of the coupling plate 20. The top of the tapered flat head screw 22 is made to raise above the top surface 26 of the coupling plate 20 approximately 0.005 of an inch. This mismatch prevents rotation of the tapered flat head screw 22 out of mounting hole 30 which has been tapered into the engine block 10. The tapered flat head screw 22 is thus screwed into the Volkswagen engine block 10. In order to screw the tapered flat head screw 22 in the Volkswagen engine block 10, the mounting hole 30 is drilled and taped for the ¼-inch screw stud 32 of the tapered flat head screw 22. The screw stud 32 of the tapered flat head screw 22 has twenty threads per inch, and is three-fourths of an inch long. The mounting hole 30 is drilled approximately seven-eighths of an inch into the Volkswagen engine block 10. The mounting hole 30 is taped for the 20 thread per inch tapered flat head screw 22. The mounting hole 30 must be drilled into the Volkswagen engine approximately in the area between oil port 36 and oil port 38 of the Volkswagen engine block 10. The oil ports 36 and 38 are 0.125 of an inch deep within the Volkswagen engine block 10.

During the mounting of the oil cooler 18, ½-inch oil seals 40 and 42, which are standard size for the Volkswagen engine block 10, are first placed in the oil ports 36 and 38 of the Volkswagen engine 10. An elliptical engine block stud hole 44 of the coupling plate 20 is placed over the engine block stud 16. The oil ports 46 and 48 are counterbored 0.125 of an inch into the coupling plate 20 to simulate oil ports 36 and 38. The oil ports 49 and 51 of FIG. 6 are counterbored 0.100 inches into the coupling plate 20 to simulate oil ports 56 and 58 in oil cooler 18. The oil ports 56 and 58 are 0.100 inches deep in the oil cooler 18. The coupling plate is 0.250 inches thick. The oil port dividers 63 and 65 are 0.025 inches thick.

The coupling plate is 4 inches long. The elliptical hole is 0.500 inches long. The distance between the inner edge 27 and the center line through the oil ports 46 and 48 is 2.375 inches. The outer diameter of the oil ports 46 and 48 is 0.545 inches. The diameter of the countersunk coupling hole 24 is 0.250 inches. The diameter of oil cooler stud holes 22 and 24, which hold the oil cooler studs 62 and 64 to the coupling plate 20, is 0.281 inches. The width of the coupling plate 20 is 2.5 inches. The coupling plate can be made from a rigid metal such as steel. Alternatively the coupling plate can be made from high melting point Nylon, a registered trademark of E. I. DuPont DeNemours and Company of Wilmington, Del. It can be seen from FIG. 1 that the distance between the inner edge 27 and the mounting holes 46 and 48 can not be much greater than 2.375 inches. The distance will prevent the inner edge 27 from coming in contact with the edge 19 of the damaged engine block 10.

The coupling plate 20 is coupled to the Volkswagen engine block 10 by means of the tapered flat head screw 22 with the oil seals 40 and 42 there between. Then the oil cooler 18 is layed upon the coupling plate 20. Engine block stud 16 passes through an oil cooler hole 60 in the oil cooler 18. The oil cooler studs 62 and 64 pass through the cooler stud holes 72 and 74. The oil cooler stud nut 82 and a simular nut connect the oil cooler studs 62 and 64 to the coupling plate 20. The engine block stud 86 connects the oil cooler 18 to the coupling plate 20 and to the engine block stud 16. Thus the Volkswagen oil cooler 18 is coupled to the damaged Volkswagen engine block 10.

The coupling is oil tight and thus prevents oil seepage between the Volkswagen engine block 10 and the oil cooler 18. The coupling plate 20 has counterbored oil ports 46, 48, 49 and 51 to accommodate oil seals 50, 52, 42, and 40 to prevent oil seepage. The countersunk coupling hole 24 is placed between the oil ports 46 and 48 to couple the coupling plate to the Volkswagen engine block 10. It is again noted that said metal exist between the oil ports 36 and 38 of the Volkswagen engine block 10 to accommodate the mounting hole 30. The mounting hole 30 can not be drilled inward of the area between the oil ports 36 and 38 since this material is part of the piston walls of the Volkswagen engine block 10. Therefore, it is necessary to drill the mounting hole 30 in the Volkswagen engine block 10 between the oil ports 36 and 38. It is therefore necessary to have the countersunk coupling hole 24 in the coupling plate 20 between the oil ports 46 and 48. The countersunk coupling hole 24 is tapered to allow the tapered flat head screw 20 to rest 0.005 of an inch above the top surface 26 of the coupling plate 20, and thus be kept from rotating. Then the tapered flat head screw 22 will not unscrew due to vibration of the Volkswagen engine block 10 during operation.

It is also noted that the engine block stud hole 44 in the coupling plate 20 is elliptical to compensate tolerance in the relationship between the distance of the engine block stud 16 passing through the coupling plate 20 and the position of the mounting hole 30 which is to be drilled into the Volkswagen engine block 10. It is to be noted that the oil cooler stud holes 72 and 74 are drilled in a position to accommodate oil cooler studs 62 and 64 of the oil cooler 18.

FIG. 2 shows an undamaged Volkswagen engine block 10. The engine block 10 is made of magnesium. The oil cooler mounting ears 12 and 14 are an extension of the magnesium engine block 10. Should the back of a Volkswagen auto be hit, the oil cooler thereon is pushed backward, to push oil cooler mounting ear 14 downward and pull oil cooler mounting ear 12 upward. The oil cooler mounting ears 12 and 14 will shear from the magnesium engine block 10. After an accident, such as a rear collision of a Volkswagen auto, the coupling plate 20 of the present invention may be used. The coupling plate 20 eliminates the need to scrap the engine block 10 or to try to weld the oil cooler mounting ears 12 and 14 back thereon. It is difficult to weld the magnesium ears 12 and 14 back on to the engine block 10. This is not a satisfactory method for reclaiming the damaged engine block 10. The use of the coupling plate 20 of FIG. 1 is a more convenient method for reclaiming the damaged engine block 10.

FIG. 3 is a top plan view of the coupling plate 20 of FIG. 1. FIG. 3 shows the countersunk hole 24 in relation to the oil ports 46 and 48 in coupling plate 20. The oil port dividers 63 and 65 are also shown. FIG. 3 also shows the elliptical hole 44 therein, and the oil cooler stud holes 72 and 74 drilled in the proper locations within the coupling plate 20. The location of the holes 72, 74, 48, 24, 46 and 44 are critical with respect to the edge 27 of the coupling plate 20. It is seen that the distance between the edge 19 of the engine block 10 of FIG. 1 and the stud 16 of the engine block 10 defines the distance between the elliptical hole 44 and the edge 27 of the coupling plate 20 of FIG. 3. The distance between the outside edge of the hole 44 and the edge 27 of the coupling plate 20 must not be greater than the distance between the stud 16 and the edge 19 of the Volkswagen engine block 10. The distance between the elliptical hole 44 and the edge 27 of the coupling plate 20 is defined. Further the distance between the edge 27 and the doubled tapered holes 46 and 48 are constrained to a maximum value. The edge 27 also constrains the maximum distance between the holes 72 and 74 and the edge 27. A relationship of the distance between a line connecting the oil ports 46 and 48 and the stud holes 72 and 74 are fixed by the distance between the studs 62 and 64 and the oil ports 56 and 58 in the oil cooler 18. The countersunk hole 24 must be between the oil ports 46 and 48 of the coupling plate 20 of FIG. 3. The outer edge 51 of the coupling plate 20 is not a critical distance from the stud holes 72 and 74. However, it is made to completely support the oil cooler 18. The distance between a line connecting the oil ports 46 and 48 and the edge 27 of the coupling plate 20 must be greater enough distance to form an elliptical hole 44 therein to connect the coupling plate 20 to the stud of the engine block 10. The placement of the countersunk hole 24 within the coupling plate 20 is critical. It must be in an area between the oil ports 46 and 48 of FIG. 3. The hole 24 must be countersunk to accommodate a tapered flat head screw 22.

FIG. 4 is a side view of the coupling plate 20 of FIG. 3. FIG. 4 shows an oil port 48 within the top surface 26 thereof. FIG. 4 also shows an oil port 49 in the bottom surface 23 thereof. Holes 48 and 49 are shown counterbored into the coupling plate 20. The oil ports 49 and 48 accommodate oil seals 42 and 52. Also shown in FIG. 4 are the oil cooler stud hole 72 and the elliptical engine block stud hole 44. Stud hole 72 accommodates oil cooler stud 62, and the elliptical engine block stud hole 44 accommodates engine block stud 16 of FIG. 1.

FIG. 5 shows the bottom surface 23 of the coupling plate 20. It is seen that the countersunk coupling hole 24 is smaller on the bottom surface 23 of the coupling plate 20 than on the top surface 24 thereof. It is also seen that the oil ports 49 and 51 align with the oil ports 48 and 46 on the top surface 24 of the coupling plate 20. The oil port dividers 63 and 65 are also shown. The oil port dividers aid in making a good oil seal when using the coupling plate 20 of the present invention.

FIG. 6 is a sectional view of FIG. 3. FIG. 6 shows the oil ports 49 and 51 and the oil ports 46 and 48. FIG. 6 also shows the oil port dividers 63 and 65. FIG. 6 also shows the countersunk coupling hole 24 within the coupling plate 20. It is seen that the countersunk coupling hole 24 is formed within the coupling plate 20 between the oil ports 46 and 48. This is necessary because the mounting hole 30, when formed in the Volkswagen engine block 10 of FIG. 1, must be between the oil ports 36 and 38 of the engine block 10 of FIG. 1.

FIG. 7 shows the coupling plate 20 mounted between the oil cooler 18 and the damaged engine block 10. FIG. 7 shows the oil seal 50 between the oil ports 56 and 46, the oil seal 40 between the oil ports 51 and 36, the oil seal 52 between the oil ports 58 and 48 and the oil seal 42 between the oil ports 49 and 38. FIG. 7 also shows the tapered flat head screw 22 positioned within the mounting hole 30. The top of the tapered flat head screw comes in contact with the bottom surface of the oil cooler 18. The coupling plate 20 allows oil within the damaged engine block 10 to be cooled by the oil cooler 18 without seepage of oil therebetween.

Volkswagen is a registered trade mark of Volkswagenwerk Aktiengesellschaft of Wolfsburg, Germany.

What is claimed is:

1. A coupling plate for coupling an oil cooler to a damaged engine block which has lost its oil cooler mounting ears comprising a thin rigid nylon plate, two oil ports counterbored into each side of said coupling plate, the oil ports on either side of the coupling plate being in alignment with an open oil port divider between the aligned oil ports on either side of the coupling plate, a countersunk coupling hole in the area between the two oil ports on one side of the coupling plate, the oil ports on the countersunk side of the flat rigid plate have a depth 0.125 of an inch and the oil ports on the other side of the coupling plate have a depth of 0.100 of an inch, two oil cooler stud holes passing through said coupling plate to one side of a line between the oil ports on one side of said coupling plate, and an engine block stud hole passing through said coupling plate to the other side of said line.

2. The coupling plate of claim 1 wherein the engine block stud hole is elliptical to allow for adjustment in connecting the coupling plate to the damaged engine block.

* * * * *